(12) United States Patent
Shirasuna et al.

(10) Patent No.: US 9,644,705 B2
(45) Date of Patent: May 9, 2017

(54) DAMPER UNIT OF INTERNAL COMBUSTION ENGINE

(71) Applicant: HONDA MOTOR CO., LTD., Tokyo (JP)

(72) Inventors: Takamori Shirasuna, Wako (JP); Hiroyuki Sugiura, Wako (JP); Mitsuyoshi Kamiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/835,718

(22) Filed: Aug. 26, 2015

(65) Prior Publication Data

US 2016/0084343 A1 Mar. 24, 2016

(30) Foreign Application Priority Data

Sep. 19, 2014 (JP) ................... 2014-191675

(51) Int. Cl.
*F16F 15/12* (2006.01)
*F16F 15/123* (2006.01)

(52) U.S. Cl.
CPC .............................. *F16F 15/1234* (2013.01)

(58) Field of Classification Search
CPC ................................................. F16F 15/1234
USPC ..................... 464/68.41, 68.7; 192/213.12
See application file for complete search history.

(56) References Cited

U.S. PATENT DOCUMENTS

| | | | | |
|---|---|---|---|---|
| 3,479,906 A | * | 11/1969 | Valus | ........................... 464/68.7 |
| 4,483,684 A | * | 11/1984 | Black | ................... F16F 15/129 |
| | | | | 464/68.7 X |
| 5,168,773 A | * | 12/1992 | Janiszewski | ........ F16F 15/1343 |
| | | | | 464/68.7 X |
| 5,873,785 A | * | 2/1999 | Friedmann | .............. F16D 13/70 |
| | | | | 464/68.7 X |

FOREIGN PATENT DOCUMENTS

| | | | |
|---|---|---|---|
| GB | 594904 | * | 11/1947 |
| GB | 2 245 336 A | * | 1/1992 |
| JP | 07-071527 | | 3/1995 |

* cited by examiner

*Primary Examiner* — Gregory Binda
(74) *Attorney, Agent, or Firm* — Mori & Ward, LLP (57) ABSTRACT

A damper unit of an internal combustion engine includes an input-side rotor, an output-side rotor, first coiled springs, second coiled springs, an input-side sliding contact surface, and a biasing member. The input-side rotor includes a first spring holder, a second spring holder, and a connecting portion. The second spring holder is arranged on a second side of the output-side rotor, has a facing side facing the output-side rotor, and has second spring accommodation portions on the facing side each of which accommodates each of the second coiled springs. The input-side sliding contact surface is provided in the second spring holder so as to be in sliding contact with an output-side sliding contact surface of the output-side rotor. The biasing member is provided between the first spring holder and the output-side rotor to press the output-side rotor toward the second spring holder.

22 Claims, 9 Drawing Sheets

DAMPER UNIT OF INTERNAL COMBUSTION ENGINE

CROSS-REFERENCE TO RELATED APPLICATIONS

The present application claims priority under 35 U. S. C. §119 to Japanese Patent Application No. 2014-191675, filed Sep. 19, 2014. The contents of this application are incorporated herein by reference in their entirety.

BACKGROUND OF THE INVENTION

Field of the Invention

The present invention relates to a damper unit of an internal combustion engine.

Discussion of the Background

A damper unit of Japanese Patent Application Publication No. Hei 7-71527 is known, which is provided between a crankshaft and an input shaft of a transmission, such that multiple coiled first springs and multiple coiled second springs arranged in the circumferential direction are placed in parallel, between an input-side rotor rotating by power transmitted from the crankshaft and an output-side rotor linked and connected to a rotary shaft.

SUMMARY OF THE INVENTION

According to one aspect of the present invention, a damper unit of an internal combustion engine includes an input-side rotor, an output-side rotor, a plurality of coiled first and second springs, an input-side sliding contact surface, and a biasing member. The input-side rotor rotates by power transmitted from a crankshaft. The output-side rotor is linked and connected to a rotary shaft capable of rotating around an axis parallel to the crankshaft. The plurality of coiled first and second springs are capable of transmitting power to the output-side rotor from the input-side rotor, and are arranged in a spaced manner in the circumferential direction of the rotary shaft. The input-side rotor is configured of a first spring holder, a second spring holder, and a connecting portion. The first spring holder is arranged on one side of the output-side rotor in a direction extending along the axis of the rotary shaft, and has a plurality of first spring accommodation portions each accommodating the first spring, on a side facing the output-side rotor. The second spring holder is arranged on the other side of the output-side rotor in the direction extending along the axis of the rotary shaft, and has a plurality of second spring accommodation portions each accommodating the second spring, on a side facing the output-side rotor. The connecting portion fixedly connects the first and second spring holders by sandwiching the output-side rotor between the spring holders. The input-side sliding contact surface in sliding contact with an output-side sliding contact surface formed in the output-side rotor is formed in the second spring holder. The biasing member biasing the output-side rotor toward the second spring holder side is inserted between the first spring holder and the output-side rotor.

According to another aspect of the present invention, a damper unit of an internal combustion engine includes an input-side rotor, an output-side rotor, first coiled springs, second coiled springs, an input-side sliding contact surface, and a biasing member. The input-side rotor is to be rotated by power transmitted from a crankshaft. The output-side rotor is connected to a rotary shaft so as to rotate with the rotary shaft which is rotatable around an axis parallel to the crankshaft. The output-side rotor has an output-side sliding contact surface and has a first side and a second side opposite to the first side in a direction extending along an axis of the rotary shaft. The first coiled springs are arranged at intervals in a circumferential direction of the rotary shaft so as to transmit power from the input-side rotor to the output-side rotor. The second coiled springs are arranged at intervals in the circumferential direction of the rotary shaft so as to transmit power from the input-side rotor to the output-side rotor. The input-side rotor includes a first spring holder, a second spring holder, and a connecting portion. The first spring holder is arranged on the first side of the output-side rotor, has a facing side facing the output-side rotor, and has first spring accommodation portions on the facing side each of which accommodates each of the first coiled springs. The second spring holder is arranged on the second side of the output-side rotor, has a facing side facing the output-side rotor, and has second spring accommodation portions on the facing side each of which accommodates each of the second coiled springs. The connecting portion connects the first spring holder and the second spring holder which sandwich the output-side rotor between the first spring holder and the second spring holder. The input-side sliding contact surface is provided in the second spring holder so as to be in sliding contact with the output-side sliding contact surface of the output-side rotor. The biasing member is provided between the first spring holder and the output-side rotor to press the output-side rotor toward the second spring holder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
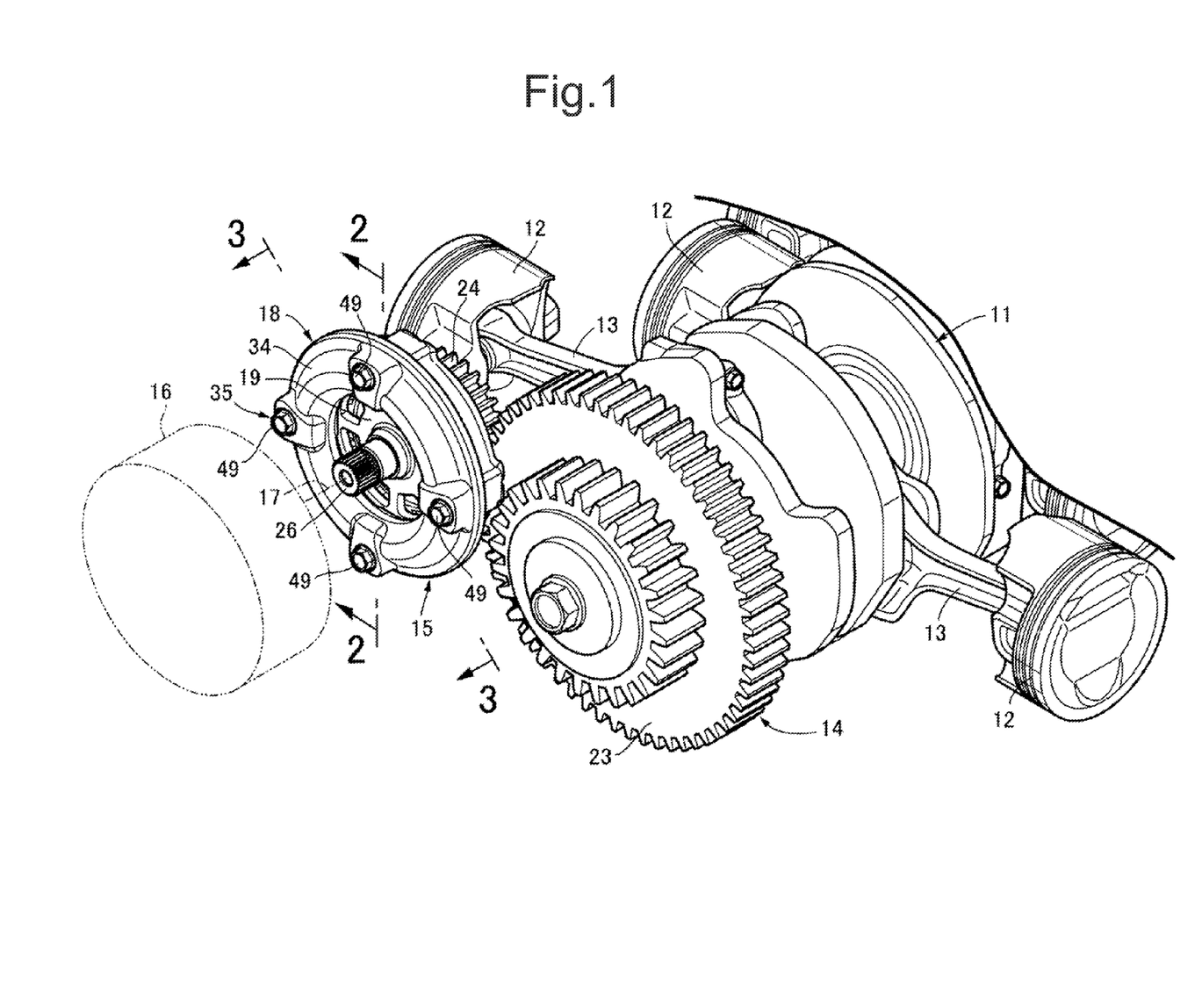
FIG. 1 is a perspective view of a part of an internal combustion engine.

First, in FIG. 1, a crankshaft 11 of a multi-cylinder internal combustion engine is connected to a piston 12 of each cylinder through a connecting rod 13, and is linked and connected to a generator 16 through a reduction gear mechanism 14 and a damper unit 15.

Figure 2:
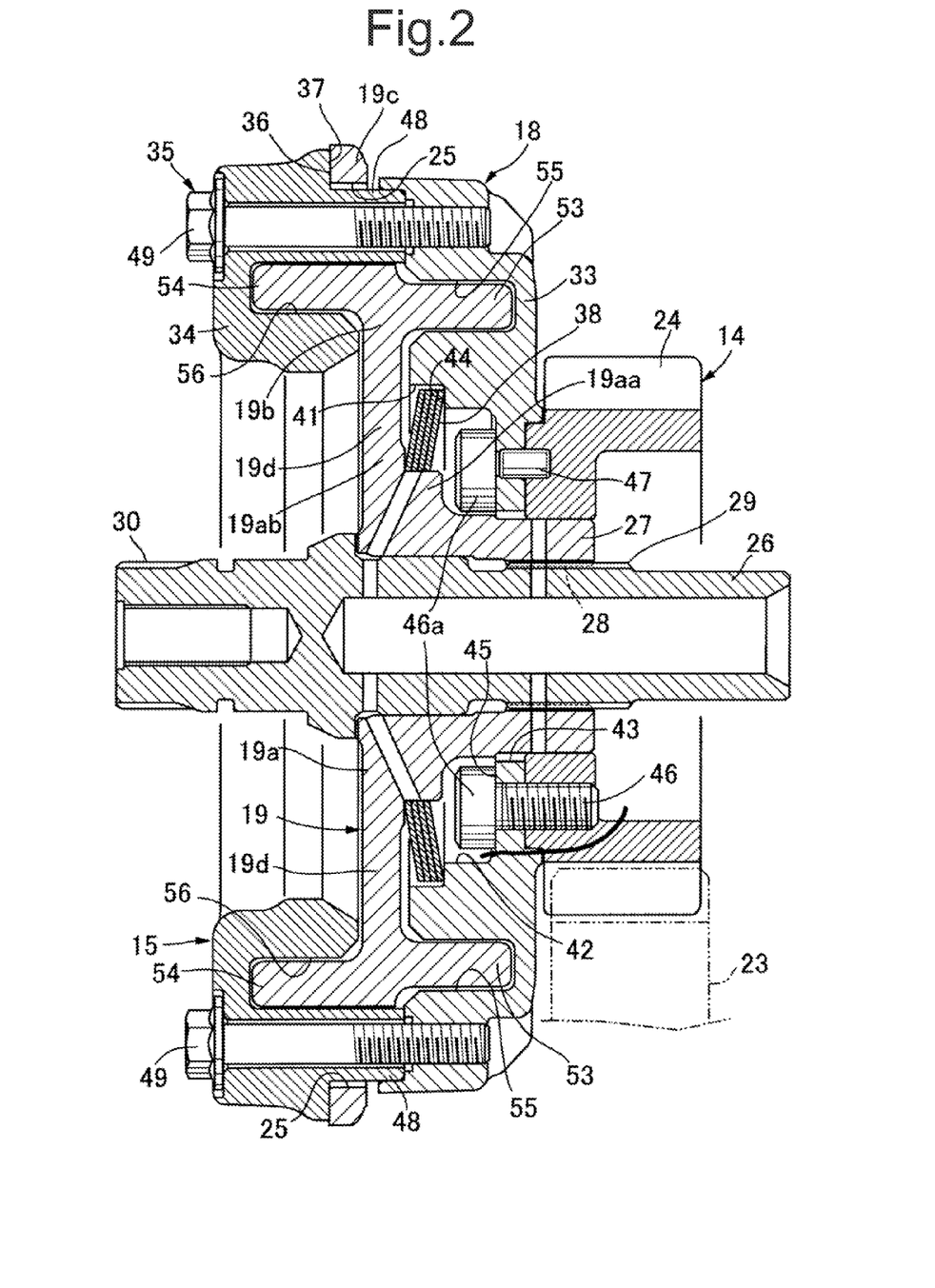
FIG. 2 is a cross sectional view of a damper unit taken along line 2-2 of FIG. 1.
Figure 3:
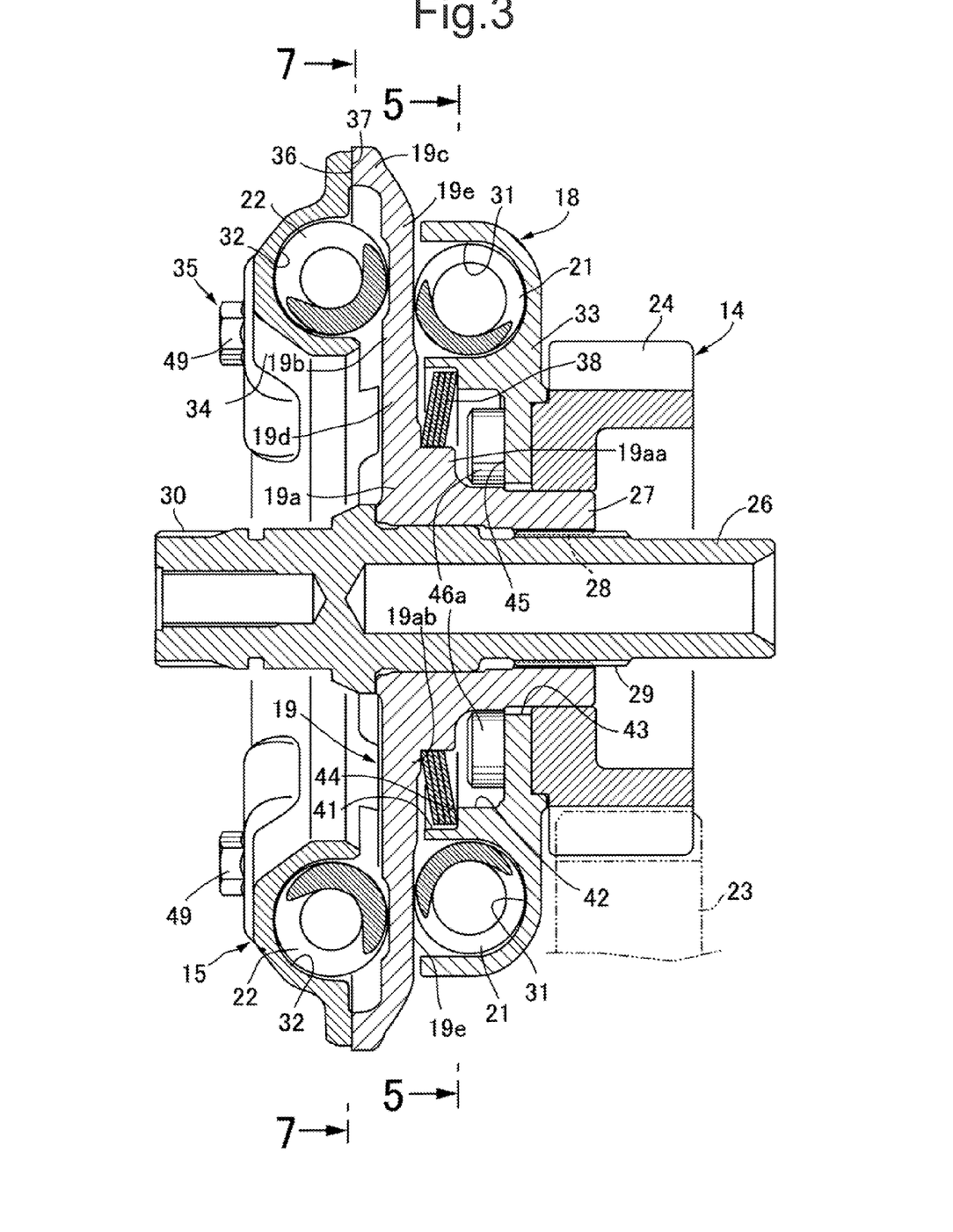
FIG. 3 is a cross sectional view of the damper unit taken along line 3-3 of FIG. 1.

Also referring to FIGS. 2 and 3, the damper unit 15 is configured according to an embodiment of the present invention, and includes an input-side rotor 18 rotating by power transmitted from the crankshaft 11 through the reduction gear mechanism 14, an output-side rotor 19 linked and connected to a rotary shaft 17 capable of rotating around an axis parallel to the crankshaft 11, and multiple coiled first and second springs 21, 22 capable of transmitting power to the output-side rotor 19 from the input-side rotor 18, and arranged in a spaced manner in the circumferential direction of the rotary shaft 17.

Although the rotary shaft 17 is a rotor shaft of the generator 16 in the embodiment, it may otherwise be a main shaft of a geared transmission.

The reduction gear mechanism 14 is configured of a drive gear 23 provided on the crankshaft 11, and a driven gear 24 meshing with the drive gear 23 and arranged on the same axis as the rotary shaft 17.

Figure 4:
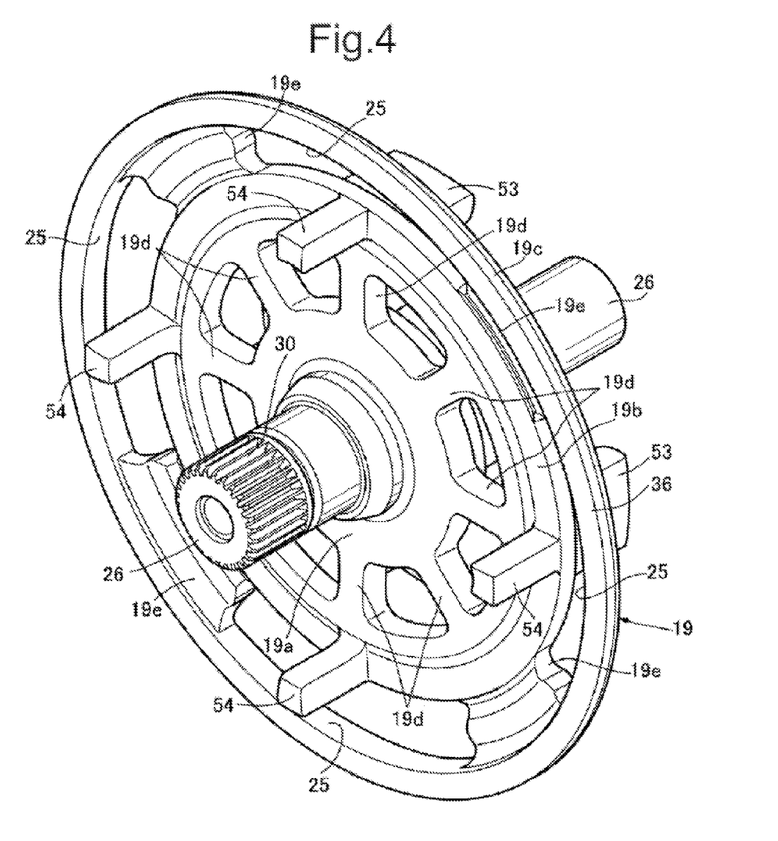
FIG. 4 is a perspective view of an output-side rotor.

Also referring to FIG. 4, the output-side rotor 19 includes, as one body, a circular plate portion 19a, a first ring portion 19b coaxially surrounding the circular plate portion 19a, a second ring portion 19c coaxially surrounding the first ring portion 19b, multiple first connecting arm portions 19d arranged radially so as to connect the outer periphery of the circular plate portion 19a and the inner periphery of the first ring portion 19b, and multiple second connecting arm portions 19e arranged radially so as to connect the outer periphery of the first ring portion 19b and the inner periphery of the second ring portion 19c. The first connecting arm portions 19d are arranged in eight parts, for example, at equal intervals in the circumferential direction of the circular plate portion 19a and the first ring portion 19b. The second connecting arm portions 19e are arranged in four parts, for example, at equal intervals in the circumferential direction of the first and second ring portions 19b, 19c, and arcuate long holes 25 extending long in the circumferential direction are formed in the output-side rotor 19 between the second connecting arm portions 19e.

The output-side rotor 19 is fixed to an output shaft 26 coaxially linked and connected to the rotary shaft 17. In the embodiment, a cylindrical tube 27 for fixing to the output shaft 26 is provided integrally with the output-side rotor 19 so as to coaxially connect a center portion of the circular plate portion 19a. The output shaft 26 having, as a part of the outer periphery thereof, spline teeth 29 to be combined with spline teeth 28 formed in the inner periphery of one end portion of the tube 27, is press-fitted into the tube 27 and penetrates therethrough. Additionally, spline teeth 30 for coaxially combining with the rotary shaft 17 so as to be incapable of rotating relative thereto, are formed on the outer periphery of one end portion of the output shaft 26.

The input-side rotor 18 is configured of: a first spring holder 33 arranged on one side of the output-side rotor 19 in the direction extending along the axis of the rotary shaft 17, and having multiple first spring accommodation portions 31 each accommodating the first spring 21, on the side facing the output-side rotor 19; a second spring holder 34 arranged on the other side of the output-side rotor 19 in the direction extending along the axis of the rotary shaft 17, and having multiple second spring accommodation portions 32 each accommodating the second spring 22, on the side facing the output-side rotor 19; and a connecting portion 35 fixedly connecting the first and second spring holders 33, 34 by sandwiching the output-side rotor 19 between the spring holders 33, 34. An input-side sliding contact surface 37 in sliding contact with an output-side sliding contact surface 36 formed in the output-side rotor 19 is formed in the second spring holder 34, and a disc spring 38 as a biasing member biasing (pressing) the output-side rotor 19 toward the second spring holder 34 side is inserted between the first spring holder 33 and the output-side rotor 19.

Figure 5:
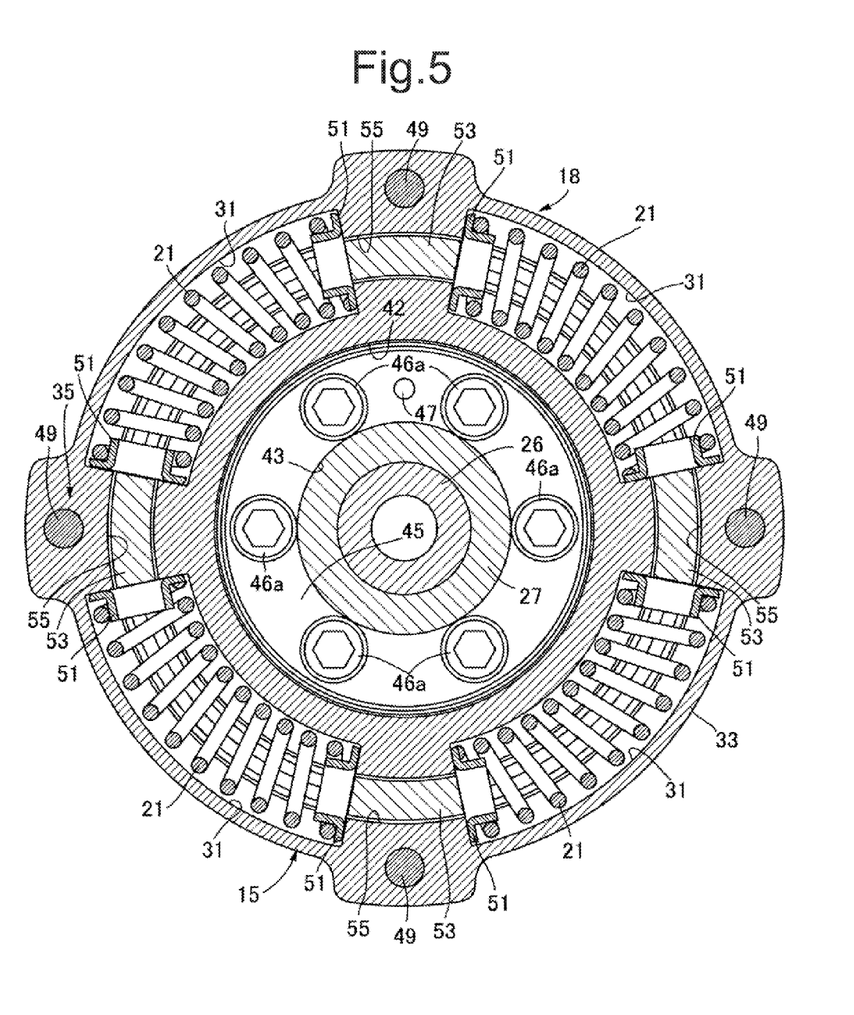
FIG. 5 is a cross sectional view taken along line 5-5 of FIG. 3.
Figure 6:
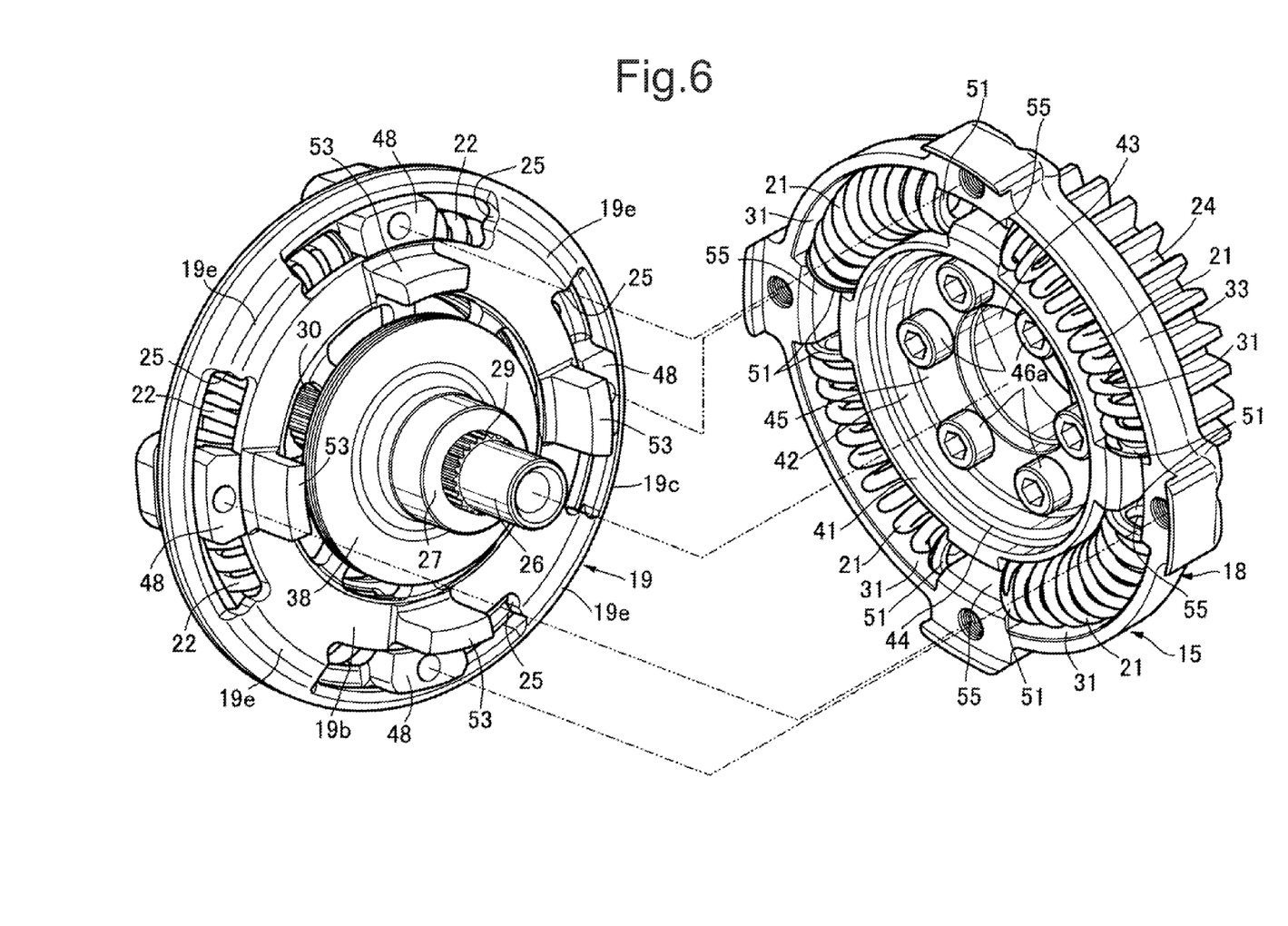
FIG. 6 is a perspective view showing the inside of the damper unit by removing a first spring holder.

Also referring to FIGS. 5 and 6, in the basically circular plate-shaped first spring holder 33, a first concave portion 41, a second concave portion 42 having a smaller diameter than the first concave portion 41, and a center hole 43 having a smaller diameter than the second concave portion 42 are provided coaxially in this order from the second spring holder 34 side. In addition, a first stepped portion 44 is formed in an annular shape between the first concave portion 41 and the second concave portion 42, a second stepped portion 45 is formed in an annular shape between the second concave portion 42 and the center hole 43, and one end portion of the tube 27 coaxially and integrally connected to the output-side rotor 19 is inserted into the center hole 43.

The driven gear 24 of the reduction gear mechanism 14 is fastened to the first spring holder 33 with multiple, such as six, bolts 46 each inserted into the first spring holder 33 so as to engage and bring into contact an enlarged-diameter head portion 46a with the second stepped portion 45. A positioning pin 47 is provided between the driven gear 24 and the first spring holder 33.

The circular plate portion 19a of the output-side rotor 19 is formed so as to have a small-diameter circular plate portion 19aa, and a large-diameter circular plate portion 19ab continuous with an end portion of the small-diameter circular plate portion 19aa on the side opposite to the first spring holder 33. The disc spring 38 is provided between the first stepped portion 44 between the first and second concave portions 41, 42 of the first spring holder 33, and the large-diameter circular plate portion 19ab of the output-side rotor 19. At least a part of the disc spring 38, that is, a part of the disc spring 38 in the embodiment, is accommodated in the first concave portion 41.

Figure 7:
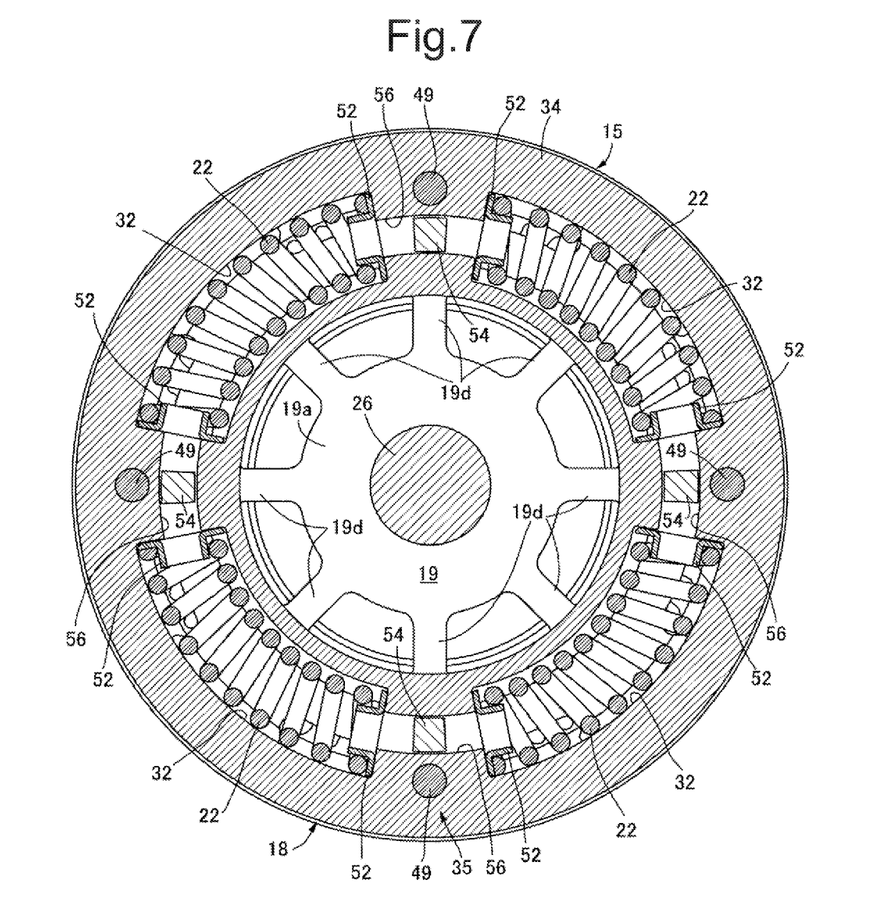
FIG. 7 is a cross sectional view taken along line 7-7 of FIG. 3.
Figure 8:
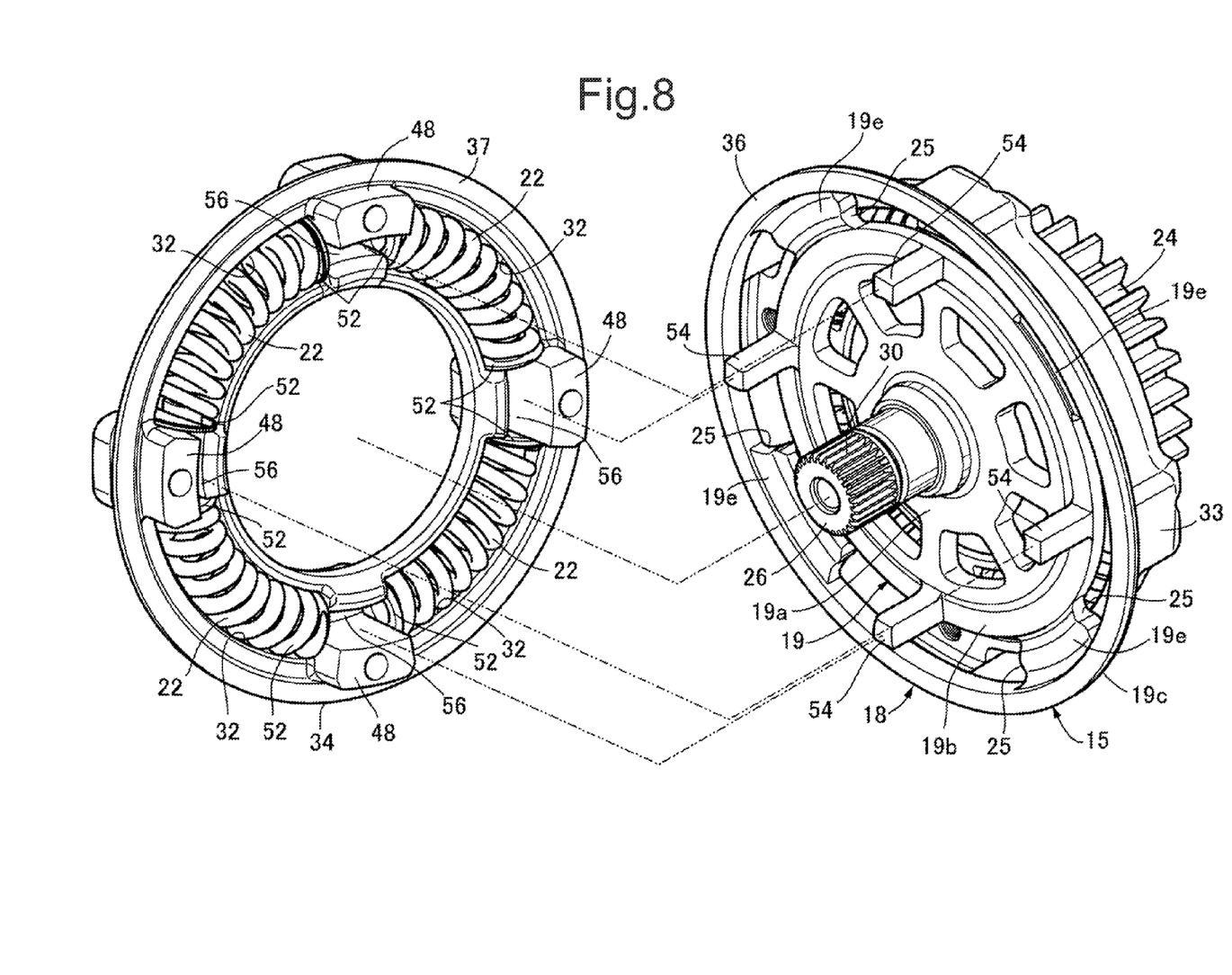
FIG. 8 is a perspective view showing the inside of the damper unit by removing a second spring holder.

Also referring to FIGS. 7 and 8, the second spring holder 34 is basically formed into a ring shape, so as to sandwich the outer periphery portion of the output-side rotor 19 between itself and the first spring holder 33.

The connecting portion 35 fixedly connecting the first and second spring holders 33, 34 by sandwiching the output-side rotor 19 between the spring holders 33, 34 is configured of: tubular bosses 48 having proximal end portions integrally connected to one of the first and second spring holders 33, 34 at multiple parts equally spaced apart in the circumferential direction, and penetrating the output-side rotor 19 such that the tip end portions abut on the other of the first and second spring holders 33, 34; and multiple bolts 49 inserted through the bosses 48 and screwed into the other of the first and second spring holders 33, 34 so as to set an initial load of the disc spring 38. In the embodiment, the connecting portion 35 is configured of: the bosses 48 having proximal end portions integrally connected to the second spring holder 34 at four parts equally spaced apart in the circumferential direction, and having tip end portions abut on the outer periphery portion of the first spring holder 33; and four bolts 49 inserted through the bosses 48 and screwed into the first spring holder 33. The boss 48 is formed into a tube shape whose outer shape has a rectangular cross section, and is arranged so as to penetrate the long hole 25 of the output-side rotor 19, to allow the output-side rotor 19 to rotate relative to the input-side rotor 18 within a limited area.

Four first spring accommodation portions 31 are provided in the first spring holder 33 on the side facing the output-side rotor 19, so as to be arranged between the bosses 48 of the connecting portion 35 in the circumferential direction of the input-side rotor 18. The first spring accommodation portions 31 are each formed into an arcuate concave portion following the shape of a virtual circle formed around the rotational axis of the input-side rotor 18, and accommodates the first spring 21 having first retainers 51 attached to both end portions thereof. Moreover, the four first spring accommodation portions 31 are arranged radially outward of the first concave portion 41 of the first spring holder 33, and a part of the disc spring 38 is accommodated in the first concave portion 41 provided in the first spring holder 33 at a position radially inward of the first spring accommodation portions 31.

In addition, the four second spring accommodation portions 32 are provided in the second spring holder 34 on the side facing the output-side rotor 19, so as to be arranged between the bosses 48 in the circumferential direction of the input-side rotor 18. The second spring accommodation portions 32 are each formed into an arcuate concave portion following the shape of a virtual circle formed around the rotational axis of the input-side rotor 18, and accommodates the second spring 22 having second retainers 52 attached to both end portions thereof.

Additionally, the output-side sliding contact surface 36 facing the second spring holder 34 side is formed in the output-side rotor 19, and the input-side sliding contact surface 37 in sliding contact with the output-side sliding contact surface 36 is formed in the second spring holder 34. What is more, the output-side rotor 19 is biased toward the second spring holder 34 side by the disc spring 38, so that the output-side sliding contact surface 36 abuts elastically against the input-side sliding contact surface 37.

The output-side sliding contact surface 36 is formed in the outer periphery portion of the output-side rotor 19 so as to be positioned radially outward of the first and second spring accommodation portions 32 of the input-side rotor 18, and in the embodiment, a surface of the second ring portion 19c of the output-side rotor 19 facing the second spring holder 34 is formed as the output-side sliding contact surface 36.

Multiple first and second drive power transmission bosses 53, 54 protruding toward the sides of the first and second spring holders 33, 34 are provided in a protruding manner on the first ring portion 19b of the output-side rotor 19, in multiple parts in the circumferential direction of the output-side rotor 19 respectively corresponding to the multiple bosses 48. The first drive power transmission boss 53 is arranged in a position with which the center of one end portion of the first spring 21 comes into contact through the first retainer 51, according to rotation of the input-side rotor 18. Meanwhile, the second drive power transmission boss 54 is arranged in a position with which the center of one end portion of the second spring 22 comes into contact through the second retainer 52, according to rotation of the input-side rotor 18.

Four first guide grooves 55 connecting the first spring accommodation portions 31 are provided so as to extend arcuately around the rotational axis of the input-side rotor 18, in the first spring holder 33 on the side facing the output-side rotor 19. The width of the first guide groove 55 along the radial direction of the input-side rotor 18 is set smaller than that of the first spring accommodation portion 31. The first drive power transmission boss 53 slidably accommodated in the first guide groove 55 can come into contact with the one end center portion of the first spring 21, through the first retainer 51.

Additionally, four second guide grooves 56 connecting the second spring accommodation portions 32 are provided so as to extend arcuately around the rotational axis of the input-side rotor 18, in the second spring holder 34 on the side facing the output-side rotor 19. The width of the second guide groove 56 along the radial direction of the input-side rotor 18 is set smaller than that of the second spring accommodation portion 32. The second drive power transmission boss 54 slidably accommodated in the second guide groove 56 can come into contact with the one end center portion of the second spring 22, through the second retainer 52.

The length along the circumferential direction of the output-side rotor 19 of some of the first and second drive power transmission bosses 53, 54 are formed shorter than that of the others of the first and second drive power transmission bosses 53, 54, and in the embodiment, the length along the circumferential direction of the output-side rotor 19 of all of the second drive power transmission bosses 54 are formed shorter than that of all of the first drive power transmission bosses 53.

The lengths of the first and second spring accommodation portions 31, 32 along the circumferential direction of the input-side rotor 18 are set substantially equal to each other, and therefore the lengths of the first and second guide grooves 55, 56 along the circumferential direction of the input-side rotor 18 are also set substantially equal to each other. When the input-side rotor 18 rotates at the beginning of operation of the damper unit 15, first, the first spring 21 comes into contact with the first drive power transmission boss 53 through the first retainer 51. Then, when the input-side rotor 18 rotates further while compressing the first spring 21, the second spring 22 comes into contact with the second drive power transmission boss 54 through the second retainer 52. Moreover, the spring load of the first spring 21 is set smaller than the spring load of the second spring 22.

Figure 9:
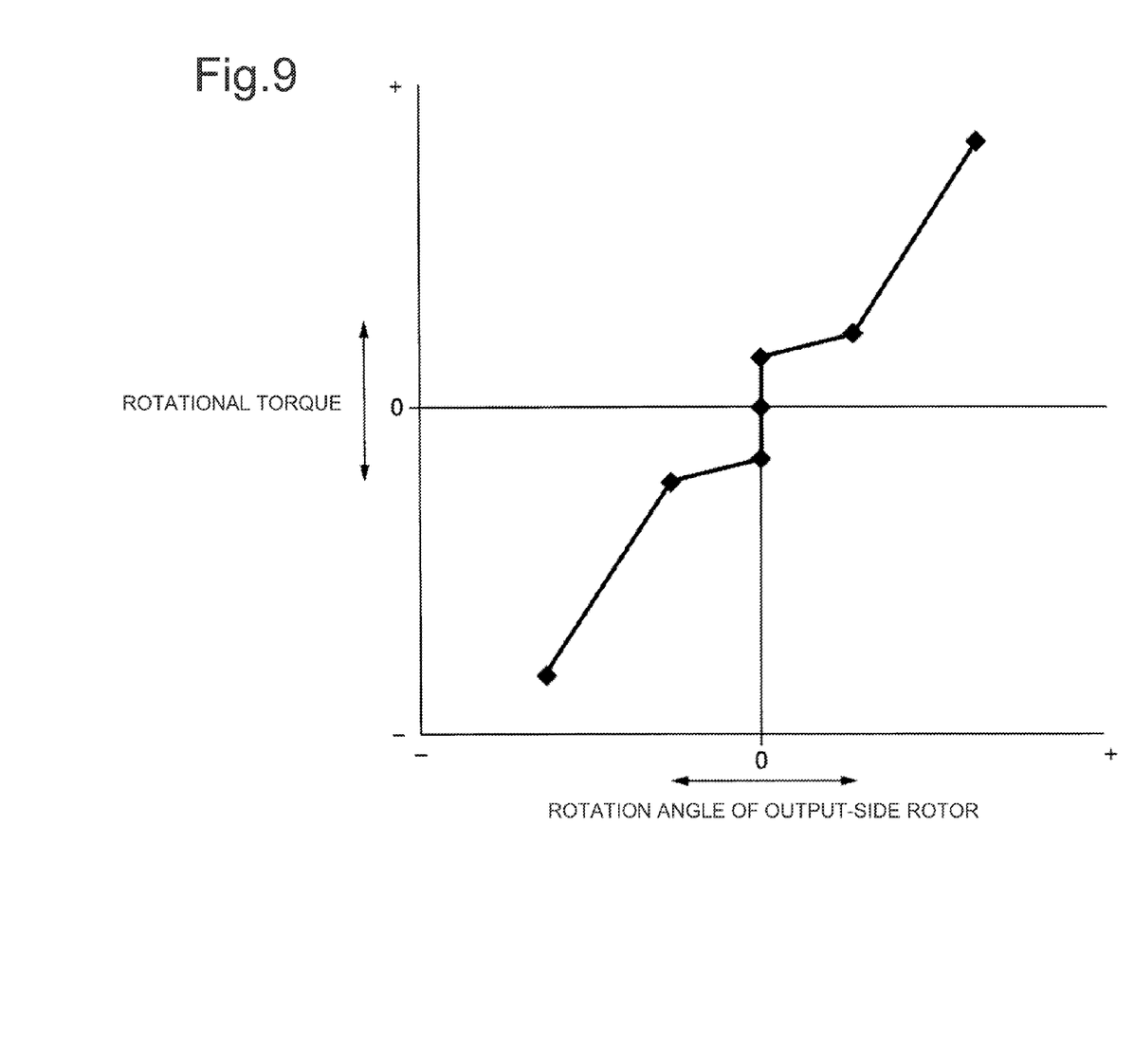
FIG. 9 is a characteristic diagram of the damper unit.

As shown in FIG. 9, in this damper unit 15, the output-side rotor 19 does not rotate until it receives input, from the input-side rotor 18, of rotational torque larger than the frictional force between the output-side sliding contact surface 36 and the input-side sliding contact surface 37, which is elastically brought into contact therewith by biasing force of the disc spring 38 at the beginning of rotation of the input-side rotor 18. Then, after the input-side rotor 18 and the output-side rotor 19 rotate against the biasing spring force of the first springs 21, the input-side rotor 18 and the output-side rotor 19 rotate against the spring force of the first and second springs 21, 22, whereby a two-stepped spring characteristic can be achieved.

Next, effects of the embodiment will be described. The input-side rotor 18 is configured of: the first spring holder 33 arranged on one side of the output-side rotor 19 in the direction extending along the axis of the rotary shaft 17, and having multiple first spring accommodation portions 31 each accommodating the first spring 21, on the side facing the output-side rotor 19; a second spring holder 34 arranged on the other side of the output-side rotor 19 in the direction extending along the axis of the rotary shaft 17, and having multiple second spring accommodation portions 32 each accommodating the second spring 22, on the side facing the output-side rotor 19; and the connecting portion 35 fixedly connecting the first and second spring holders 33, 34 by sandwiching the output-side rotor 19 between the spring holders 33, 34. Additionally, the input-side sliding contact surface 37 in sliding contact with the output-side sliding contact surface 36 formed in the output-side rotor 19 is formed in the second spring holder 34, and the disc spring 38 biasing the output-side rotor 19 toward the second spring holder 34 side is inserted between the first spring holder 33 and the output-side rotor 19. Hence, not only can the amount of stored energy be increased by enlarging the load required at the beginning of operation of the damper unit 15, but also enlargement of the damper unit 15 in the axial direction can be avoided.

Also, since at least a part of the disc spring 38 is accommodated in the concave portion 41 provided in the first spring holder 33 at a position radially inward of the first spring accommodation portions 31, the damper unit 15 can be made even smaller in the axial direction.

Also, since the output-side sliding contact surface 36 is formed in the outer periphery portion of the output-side rotor 19 so as to be positioned radially outward of the first and second spring accommodation portions 31, 32 of the input-side rotor 18, the output-side and input-side sliding contact surfaces 36, 37 can be arranged further outward in the radial direction of the damper unit 15, so that the load torque required at the beginning of operation of the damper unit 15 can be set to a large amount.

Also, the connecting portion 35 is configured of: the tubular bosses 48 having proximal end portions integrally connected to the second spring holder 34 at multiple parts equally spaced apart in the circumferential direction, and penetrating the output-side rotor 19 such that the tip end portions abut on the first spring holder 33; and the multiple bolts 49 inserted through the bosses 48 and screwed into the first spring holder 33 so as to set an initial load of the disc spring 38. Hence, the initial load of the disc spring 38 is determined by tightening of the bolts 49, and assembly of the damper unit 15 can be made easier.

Also, the output-side rotor 19 is coaxially fixed to the output shaft 26 linked and connected to the rotary shaft 17. Hence, by configuring the input-side rotor 18 by fastening the first and second spring holders 33, 34 sandwiching the output-side rotor 19, by screwing the bolts 49 with the disc spring 38 interposed between the first spring holder 33 and the output-side rotor 19, while the output-side rotor 19 is fixed to the output shaft 26, the output-side rotor 19 is biased toward the second spring holder 34 side by the disc spring 38, so that the output-side sliding contact surface 36 abuts elastically against the input-side sliding contact surface 37. Thus, the axial position of the input-side rotor 18 relative to the output-side rotor 19 can be defined. Therefore, the need for a member such as a snap ring for defining the axial position of the input-side rotor 18 is eliminated, and the number of parts can be reduced.

Also, since the first and second spring accommodation portions 31, 32 are arranged between the multiple bosses 48 in the circumferential direction of the input-side rotor 18, the first and second springs 21, 22 can be arranged by effectively utilizing the spaces between the multiple bosses 48. Moreover, the multiple first and second drive power transmission bosses 53, 54 protruding toward the sides of the first and second spring holders 33, 34 are provided in a protruding manner in multiple parts in the circumferential direction of the output-side rotor 19 respectively corresponding to the multiple bosses 48, the first drive power transmission boss 53 is arranged in a position with which the center of one end portion of the first spring 21 comes into contact according to rotation of the input-side rotor 18, and the second drive power transmission boss 54 is arranged in a position with which the center of one end portion of the second spring 22 comes into contact according to rotation of the input-side rotor 18. Hence, the first and second springs 21, 22 can operate smoothly.

Further, the length along the circumferential direction of the output-side rotor 19 of the second drive power transmission boss 54 provided in a protruding manner in the output-side rotor 19, is formed shorter than that of the first drive power transmission boss 53. Hence, the second spring 22 is brought into contact later with the second drive power transmission boss 54 than with the first drive power transmission boss 53, so that the damper unit 15 is allowed to have a multi-stepped spring characteristic, and adjustment of the characteristic of the damper unit 15 can be made easy.

Although the embodiment of the present invention has been described, the invention is not limited to the embodiment, and various design changes can be made without departing from the invention described in the claims.

The embodiment of the present invention is a damper unit of an internal combustion engine including: an input-side rotor rotating by power transmitted from a crankshaft; an output-side rotor linked and connected to a rotary shaft capable of rotating around an axis parallel to the crankshaft; and multiple coiled first and second springs capable of transmitting power to the output-side rotor from the input-side rotor, and arranged in a spaced manner in the circumferential direction of the rotary shaft. A first characteristic is that: the input-side rotor is configured of a first spring holder arranged on one side of the output-side rotor in a direction extending along the axis of the rotary shaft, and having multiple first spring accommodation portions each accommodating the first spring, on a side facing the output-side rotor, a second spring holder arranged on the other side of the output-side rotor in the direction extending along the axis of the rotary shaft, and having multiple second spring accommodation portions each accommodating the second spring, on a side facing the output-side rotor, and a connecting portion fixedly connecting the first and second spring holders by sandwiching the output-side rotor between the spring holders; an input-side sliding contact surface in sliding contact with an output-side sliding contact surface formed in the output-side rotor is formed in the second spring holder; and a biasing member biasing the output-side rotor toward the second spring holder side is inserted between the first spring holder and the output-side rotor.

A second characteristic of the embodiment of the present invention is that, in addition of the configuration of first characteristic, at least a part of the biasing member is accommodated in a concave portion provided in the first spring holder at a position radially inward of the first spring accommodation portion.

A third characteristic of the embodiment of the present invention is that, in addition to the configuration of the first or second characteristic, the output-side sliding contact surface is formed in an outer periphery portion of the output-side rotor, so as to be positioned radially outward of the first and second spring accommodation portions of the input-side rotor.

A fourth characteristic of the embodiment of the present invention is that, in addition to the configuration of any of the first to third characteristics, the connecting portion is configured of tubular bosses having proximal end portions integrally connected to one of the first and second spring holders at multiple parts equally spaced apart in the circumferential direction, and penetrating the output-side rotor such that tip end portions abut on the other of the first and second spring holders, and multiple bolts inserted through the bosses and screwed into the other of the first and second spring holders so as to set an initial load of the biasing member.

A fifth characteristic of the embodiment of the present invention is that, in addition to the configuration of the fourth characteristic, the output-side rotor is coaxially fixed to an output shaft linked and connected to the rotary shaft.

A sixth characteristic of the embodiment of the present invention is that, in addition to the configuration of the fourth or fifth characteristic, the first and second spring accommodation portions are arranged between the multiple bosses in the circumferential direction of the input-side rotor; multiple first and second drive power transmission bosses protruding toward the sides of the first and second spring holders are provided in a protruding manner on the output-side rotor, in multiple parts in the circumferential direction of the output-side rotor respectively corresponding to the multiple bosses; the first drive power transmission boss is arranged in a position with which the center of one end portion of the first spring comes into contact according to rotation of the input-side rotor; and the second drive power transmission boss is arranged in a position with which the center of one end portion of the second spring comes into contact according to rotation of the input-side rotor.

Further, a seventh characteristic of the embodiment of the present invention is that, in addition to the configuration of the sixth characteristic, the length along the circumferential direction of the output-side rotor of some of the multiple first and second drive power transmission bosses provided in a protruding manner on the output-side rotor, is formed shorter than that of the others of the first and second drive power transmission bosses.

According to the first characteristic of the embodiment of the present invention, the input-side rotor is configured such that the first and second spring holders sandwiching the output-side rotor are fixedly connected by the connecting portion, the multiple first springs are accommodated in the first spring holder on the side facing the output-side rotor, the multiple second springs are accommodated in the second spring holder on the side facing the output-side rotor, and the biasing member that elastically brings the output-side sliding contact surface formed in the output-side rotor into sliding contact with the input-side sliding contact surface formed in the second spring holder, is inserted between the first spring holder and the output-side rotor. Hence, not only can the amount of stored energy be increased by enlarging the load required at the beginning of operation, but also enlargement of the damper unit in the axial direction can be avoided.

Also, according to the second characteristic of the embodiment of the present invention, since at least a part of the biasing member is accommodated in the concave portion provided in the first spring holder at a position radially inward of the first spring accommodation portion, the damper unit can be made even smaller in the axial direction.

According to the third characteristic of the embodiment of the present invention, since the output-side sliding contact surface is arranged radially outward of the first and second spring accommodation portions, the output-side and input-side sliding contact surfaces can be arranged further outward in the radial direction of the damper unit, so that the load torque required at the beginning of operation of the damper unit can be set to a large amount.

According to the fourth characteristic of the embodiment of the present invention, the connecting portion fixedly connecting the first and second spring holders is configured of the multiple tubular bosses having proximal end portions integrally connected to one of the first and second spring holders and penetrating the output-side rotor, and the multiple bolts inserted through the bosses and screwed into the other of the first and second spring holders. Hence, the initial load of the biasing member is determined by tightening of the bolts, and assembly of the damper unit can be made easier.

According to the fifth characteristic of the embodiment of the present invention, the output-side rotor is coaxially fixed to the output shaft linked and connected to the rotary shaft. Hence, by configuring the input-side rotor by fastening the first and second spring holders sandwiching the output-side rotor, by screwing the bolts with the biasing member interposed between the first spring holder and the output-side rotor, while the output-side rotor is fixed to the output shaft, the output-side rotor is biased toward the second spring holder side by the biasing member, so that the output-side sliding contact surface abuts elastically against the input-side sliding contact surface. Thus, the axial position of the input-side rotor relative to the output-side rotor can be defined. Therefore, the need for a member such as a snap ring for defining the axial position of the input-side rotor is eliminated, and the number of parts can be reduced.

According to the sixth characteristic of the embodiment of the present invention, since the first and second spring accommodation portions are arranged between the multiple bosses in the circumferential direction of the input-side rotor, the first and second springs can be arranged by effectively utilizing the spaces between the multiple bosses. Moreover, the center of one end portions of the first and second springs come into contact, according to rotation of the input-side rotor, with the multiple first and second drive power transmission bosses provided in a protruding manner on the output-side rotor so as to protrude toward the sides of the first and second spring holders. Hence, the first and second springs can operate smoothly.

Further, according to the seventh characteristic of the embodiment of the present invention, the length along the circumferential direction of the output-side rotor of some of the first and second drive power transmission bosses is formed shorter than that of the others of the first and second drive power transmission bosses. Hence, at least some of the first and second springs are brought into contact with some of the first and second drive power transmission bosses in a delayed manner, so that the damper unit is allowed to have a multi-stepped spring characteristic, and adjustment of the characteristic of the damper unit can be made easy.

Obviously, numerous modifications and variations of the present invention are possible in light of the above teachings. It is therefore to be understood that within the scope of the appended claims, the invention may be practiced otherwise than as specifically described herein.

What is claimed is:

1. A damper unit of an internal combustion engine comprising:
an input-side rotor rotating by power transmitted from a crankshaft;
an output-side rotor linked and connected to a rotary shaft capable of rotating around an axis parallel to the crankshaft; and
a plurality of coiled first and second springs capable of transmitting power to the output-side rotor from the input-side rotor, and arranged in a spaced manner in the circumferential direction of the rotary shaft, wherein:
the input-side rotor is configured of
a first spring holder arranged on one side of the output-side rotor in a direction extending along the axis of the rotary shaft, and having a plurality of first spring accommodation portions each accommodating the first spring, on a side facing the output-side rotor,
a second spring holder arranged on the other side of the output-side rotor in the direction extending along the axis of the rotary shaft, and having a plurality of second spring accommodation portions each accommodating the second spring, on a side facing the output-side rotor, and
a connecting portion fixedly connecting the first and second spring holders by sandwiching the output-side rotor between the spring holders;
an input-side sliding contact surface in sliding contact with an output-side sliding contact surface formed in the output-side rotor is formed in the second spring holder; and
a biasing member biasing the output-side rotor toward the second spring holder side is inserted directly between the first spring holder and the output-side rotor.

2. The damper unit of an internal combustion engine according to claim 1, wherein
at least a part of the biasing member is accommodated in a concave portion provided in the first spring holder at a position radially inward of the first spring accommodation portion.

3. The damper unit of an internal combustion engine according to claim 1, wherein
the output-side sliding contact surface is formed in an outer periphery portion of the output-side rotor, so as to be positioned radially outward of the first and second spring accommodation portions of the input-side rotor.

4. The damper unit of an internal combustion engine according to claim 1, wherein
the biasing member is a spring.

5. The damper unit of an internal combustion engine according to claim 1, wherein
the biasing member is a disc spring.

6. The damper unit of an internal combustion engine according to claim 1, wherein
the input-side sliding contact surface is provided at an outermost periphery portion of the input-side rotor.

7. A damper unit of an internal combustion engine comprising:
an input-side rotor rotating by power transmitted from a crankshaft;
an output-side rotor linked and connected to a rotary shaft capable of rotating around an axis parallel to the crankshaft; and
a plurality of coiled first and second springs capable of transmitting power to the output-side rotor from the input-side rotor, and arranged in a spaced manner in the circumferential direction of the rotary shaft, wherein:
the input-side rotor is configured of
a first spring holder arranged on one side of the output-side rotor in a direction extending along the axis of the rotary shaft, and having a plurality of first spring accommodation portions each accommodating the first spring, on a side facing the output-side rotor,
a second spring holder arranged on the other side of the output-side rotor in the direction extending along the axis of the rotary shaft, and having a plurality of second spring accommodation portions each accommodating the second spring, on a side facing the output-side rotor, and
a connecting portion fixedly connecting the first and second spring holders by sandwiching the output-side rotor between the spring holders;
an input-side sliding contact surface in sliding contact with an output-side sliding contact surface formed in the output-side rotor is formed in the second spring holder; and
a biasing member biasing the output-side rotor toward the second spring holder side is inserted between the first spring holder and the output-side rotor, wherein
the connecting portion is configured of
tubular bosses having proximal end portions integrally connected to one of the first and second spring holders at a plurality of parts equally spaced apart in the circumferential direction, and penetrating the output-side rotor such that tip end portions abut on the other of the first and second spring holders, and
a plurality of bolts inserted through the bosses and screwed into the other of the first and second spring holders so as to set an initial load of the biasing member.

8. The damper unit of an internal combustion engine according to claim 7, wherein
the output-side rotor is coaxially fixed to an output shaft linked and connected to the rotary shaft.

9. The damper unit of an internal combustion engine according to claim 7, wherein:
the first and second spring accommodation portions are arranged between the plurality of bosses in the circumferential direction of the input-side rotor;
a plurality of first and second drive power transmission bosses protruding toward the sides of the first and second spring holders are provided in a protruding manner on the output-side rotor, in a plurality of parts in the circumferential direction of the output-side rotor respectively corresponding to the plurality of bosses;
the first drive power transmission boss is arranged in a position with which the center of one end portion of the first spring comes into contact according to rotation of the input-side rotor; and
the second drive power transmission boss is arranged in a position with which the center of one end portion of the second spring comes into contact according to rotation of the input-side rotor.

10. The damper unit of an internal combustion engine according to claim 9, wherein
the length along the circumferential direction of the output-side rotor of some of the plurality of first and second drive power transmission bosses provided in a protruding manner on the output-side rotor, is formed shorter than that of the others of the first and second drive power transmission bosses.

11. A damper unit of an internal combustion engine, comprising:
an input-side rotor to be rotated by power transmitted from a crankshaft;
an output-side rotor connected to a rotary shaft so as to rotate with the rotary shaft which is rotatable around an axis parallel to the crankshaft, the output-side rotor having an output-side sliding contact surface and having a first side and a second side opposite to the first side in a direction extending along an axis of the rotary shaft;
first coiled springs arranged at intervals in a circumferential direction of the rotary shaft so as to transmit power from the input-side rotor to the output-side rotor;
second coiled springs arranged at intervals in the circumferential direction of the rotary shaft so as to transmit power from the input-side rotor to the output-side rotor, the input-side rotor comprising:
a first spring holder arranged on the first side of the output-side rotor, having a facing side facing the output-side rotor, and having first spring accommodation portions on the facing side each of which accommodates each of the first coiled springs;

a second spring holder arranged on the second side of the output-side rotor, having a facing side facing the output-side rotor, and having second spring accommodation portions on the facing side each of which accommodates each of the second coiled springs; and a connecting portion connecting the first spring holder and the second spring holder which sandwich the output-side rotor between the first spring holder and the second spring holder;

an input-side sliding contact surface provided in the second spring holder so as to be in sliding contact with the output-side sliding contact surface of the output-side rotor; and a biasing member provided directly between the first spring holder and the output-side rotor to press the output-side rotor toward the second spring holder.

12. The damper unit according to claim 11, wherein at least a part of the biasing member is accommodated in a concave portion provided in the first spring holder at a position radially inward of the first spring accommodation portions.

13. The damper unit according to claim 11, wherein the output-side sliding contact surface is provided in an outer periphery portion of the output-side rotor so as to be positioned radially outward of the first and second spring accommodation portions of the input-side rotor.

14. The damper unit according to claim 11, wherein a length of one of the first spring accommodation portions along a circumferential direction of the input-side rotor is set substantially equal to a length of one of the second spring accommodation portions along the circumferential direction of the input-side rotor.

15. The damper unit according to claim 11, wherein the biasing member is a spring.

16. The damper unit according to claim 11, wherein the biasing member is a disc spring.

17. The damper unit according to claim 11, wherein the input-side sliding contact surface is provided at an outermost periphery portion of the input-side rotor.

18. A damper unit of an internal combustion engine, comprising:

an input-side rotor to be rotated by power transmitted from a crankshaft;

an output-side rotor connected to a rotary shaft so as to rotate with the rotary shaft which is rotatable around an axis parallel to the crankshaft, the output-side rotor having an output-side sliding contact surface and having a first side and a second side opposite to the first side in a direction extending along an axis of the rotary shaft;

first coiled springs arranged at intervals in a circumferential direction of the rotary shaft so as to transmit power from the input-side rotor to the output-side rotor;

second coiled springs arranged at intervals in the circumferential direction of the rotary shaft so as to transmit power from the input-side rotor to the output-side rotor, the input-side rotor comprising:

a first spring holder arranged on the first side of the output-side rotor, having a facing side facing the output-side rotor, and having first spring accommodation portions on the facing side each of which accommodates each of the first coiled springs;

a second spring holder arranged on the second side of the output-side rotor, having a facing side facing the output-side rotor, and having second spring accommodation portions on the facing side each of which accommodates each of the second coiled springs; and a connecting portion connecting the first spring holder and the second spring holder which sandwich the output-side rotor between the first spring holder and the second spring holder;

an input-side sliding contact surface provided in the second spring holder so as to be in sliding contact with the output-side sliding contact surface of the output-side rotor; and a biasing member provided between the first spring holder and the output-side rotor to press the output-side rotor toward the second spring holder, wherein the connecting portion comprises tubular bosses having proximal end portions integrally connected to one of the first and second spring holders at parts equally spaced apart in a circumferential direction of the one of the first and second spring holders, and penetrating the output-side rotor such that tip end portions of the tubular bosses abut on another of the first and second spring holders, and bolts inserted through the tubular bosses and screwed into the another of the first and second spring holders so as to set an initial load of the biasing member.

19. The damper unit according to claim 18, wherein the output-side rotor is coaxially fixed to an output shaft which is connected to the rotary shaft so as to rotate with the rotary shaft.

20. The damper unit according to claim 18, wherein the first and second spring accommodation portions are arranged between the tubular bosses in a circumferential direction of the input-side rotor, wherein first and second drive power transmission bosses respectively protruding toward the first and second spring holders are provided in a protruding state on the output-side rotor, in parts in a circumferential direction of the output-side rotor respectively corresponding to the tubular bosses, wherein one of the first drive power transmission bosses is arranged in a position with which a center of one end portion of one of the first coiled springs comes into contact according to rotation of the input-side rotor, and wherein one of the second drive power transmission bosses is arranged in a position with which a center of one end portion of one of the second coiled springs comes into contact according to rotation of the input-side rotor.

21. The damper unit according to claim 20, wherein a length along the circumferential direction of the output-side rotor of some of the first and second drive power transmission bosses provided in a protruding state on the output-side rotor, is provided shorter than a length along the circumferential direction of the output-side rotor of others of the first and second drive power transmission bosses.

22. A damper unit of an internal combustion engine, comprising:

an input-side rotor to be rotated by power transmitted from a crankshaft;

an output-side rotor connected to a rotary shaft so as to rotate with the rotary shaft which is rotatable around an axis parallel to the crankshaft, the output-side rotor having an output-side sliding contact surface and having a first side and a second side opposite to the first side in a direction extending along an axis of the rotary shaft;

first coiled springs arranged at intervals in a circumferential direction of the rotary shaft so as to transmit power from the input-side rotor to the output-side rotor;

second coiled springs arranged at intervals in the circumferential direction of the rotary shaft so as to transmit power from the input-side rotor to the output-side rotor, the input-side rotor comprising:

- a first spring holder arranged on the first side of the output-side rotor, having a facing side facing the output-side rotor, and having first spring accommodation portions on the facing side each of which accommodates each of the first coiled springs;
- a second spring holder arranged on the second side of the output-side rotor, having a facing side facing the output-side rotor, and having second spring accommodation portions on the facing side each of which accommodates each of the second coiled springs; and
- a connecting portion connecting the first spring holder and the second spring holder which sandwich the output-side rotor between the first spring holder and the second spring holder;

an input-side sliding contact surface provided in the second spring holder so as to be in sliding contact with the output-side sliding contact surface of the output-side rotor; and a biasing member provided between the first spring holder and the output-side rotor to press the output-side rotor toward the second spring holder, wherein a spring load of one of the first coiled springs is set smaller than a spring load of one of the second coiled springs.

* * * * *